(12) United States Patent
Shingai

(10) Patent No.: US 11,366,626 B2
(45) Date of Patent: Jun. 21, 2022

(54) IMAGE FORMING APPARATUS AND OPERATION PANEL UNIT OF THE IMAGE FORMING APPARATUS

(71) Applicant: Brother Kogyo Kabushiki Kaisha, Nagoya (JP)

(72) Inventor: Hiroyuki Shingai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/830,529

(22) Filed: Mar. 26, 2020

(65) Prior Publication Data
US 2020/0310711 A1    Oct. 1, 2020

(30) Foreign Application Priority Data
Mar. 28, 2019  (CN) .......................... 201920406054.6

(51) Int. Cl.
*G06F 3/12*    (2006.01)
*H04N 1/00*    (2006.01)

(52) U.S. Cl.
CPC ....... *G06F 3/1279* (2013.01); *H04N 1/00493* (2013.01); *H04N 1/00496* (2013.01); *G06F 3/1203* (2013.01); *G06F 3/1236* (2013.01); *H04N 2201/006* (2013.01)

(58) Field of Classification Search
CPC combination set(s) only.
See application file for complete search history.

(56) References Cited

U.S. PATENT DOCUMENTS

| | | | |
|---|---|---|---|
| 11,025,786 B2 * | 6/2021 | Shingai | H04N 1/00307 |
| 2004/0233620 A1 * | 11/2004 | Doczy | G06F 1/1669 361/679.15 |
| 2017/0310836 A1 | 10/2017 | Nakayama et al. | |

FOREIGN PATENT DOCUMENTS

JP    2017-196747 A    11/2017

* cited by examiner

*Primary Examiner* — Barbara D Reinier
(74) *Attorney, Agent, or Firm* — Burr & Brown, PLLC

(57) ABSTRACT

An operation panel unit is used for an image forming apparatus. The operation panel unit is configured to input various control instructions to the image forming apparatus. The operation panel unit includes a display portion, an NFC reading portion, and a USB port. The NFC reading portion and the USB port are disposed on different surfaces of the display portion.

3 Claims, 4 Drawing Sheets

IMAGE FORMING APPARATUS AND OPERATION PANEL UNIT OF THE IMAGE FORMING APPARATUS

CROSS-REFERENCE TO RELATED APPLICATION

This application claims priority from Chinese Utility Model Application No. 201920406054.6 filed on Mar. 28, 2019, the content of which is incorporated herein by reference in its entirety.

TECHNICAL FIELD

Aspects of the disclosure relate to an image forming apparatus and an operation panel unit used for the image forming apparatus.

BACKGROUND

An operation panel unit used for an image forming apparatus is known. The operation panel unit includes a display portion and can be input various control instructions to the image forming apparatus by directly pressing a display surface of the display portion (e.g., a touch-panel type) or by using a button disposed near the display surface (e.g., a switch type). In addition, the operation panel unit further includes a near field communication (hereinafter referred to as NFC) function. When a mobile terminal and an NFC reading portion disposed on the operation panel unit are close to each other, data communication can be performed, thereby realizing functions such as user identification authentication and user terminal access.

However, when a USB port is disposed on the operation panel unit as described above and the mobile terminal using the NFC reading portion and a device using the USB port are present at the same time, the problems of mutual interference may occur due to position of arrangement.

SUMMARY OF THE INVENTION

Aspects of the disclosure provide an operation panel unit used for an image forming apparatus, which avoids mutual interference when the mobile terminal using the NFC reading portion and the device using the USB port are present at the same time.

According to aspects of the disclosure, an operation panel unit may be used for an image forming apparatus and be configured to input various control instructions to the image forming apparatus. The operation panel unit may include a display portion, an NFC reading portion, and a USB port. The NFC reading portion and the USB port may be disposed on different surfaces of the display portion.

According to one or more aspects of the disclosure, an image forming apparatus may include an operation panel unit. The operation panel unit may be configured to input various control instructions to the image recording apparatus. The operation panel unit may include a display portion, an NFC reading portion, and a USB port. The NFC reading portion and the USB port may be disposed on different surfaces of the display portion.

BRIEF DESCRIPTION OF THE DRAWINGS

Aspects of the disclosure are illustrated by way of example and not by limitation in the accompanying figures in which like reference characters indicate similar elements.

DETAILED DESCRIPTION OF THE INVENTION

Hereinafter, an embodiment of the present disclosure will be described with reference to the drawings. In each drawing, about components having the same function are denoted by the same reference mark.

Figure 1:
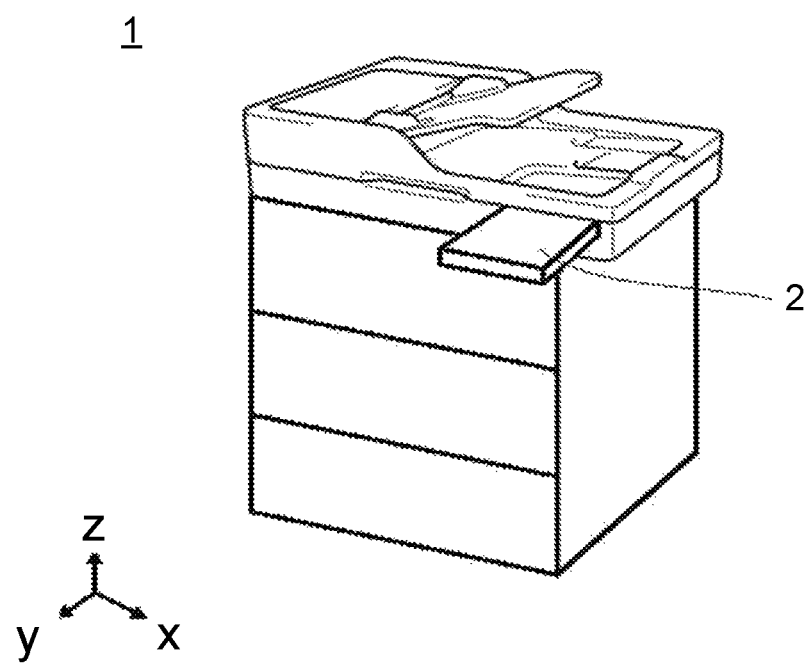
FIG. 1 is a schematic view of an example of an image forming apparatus.
Figure 2:
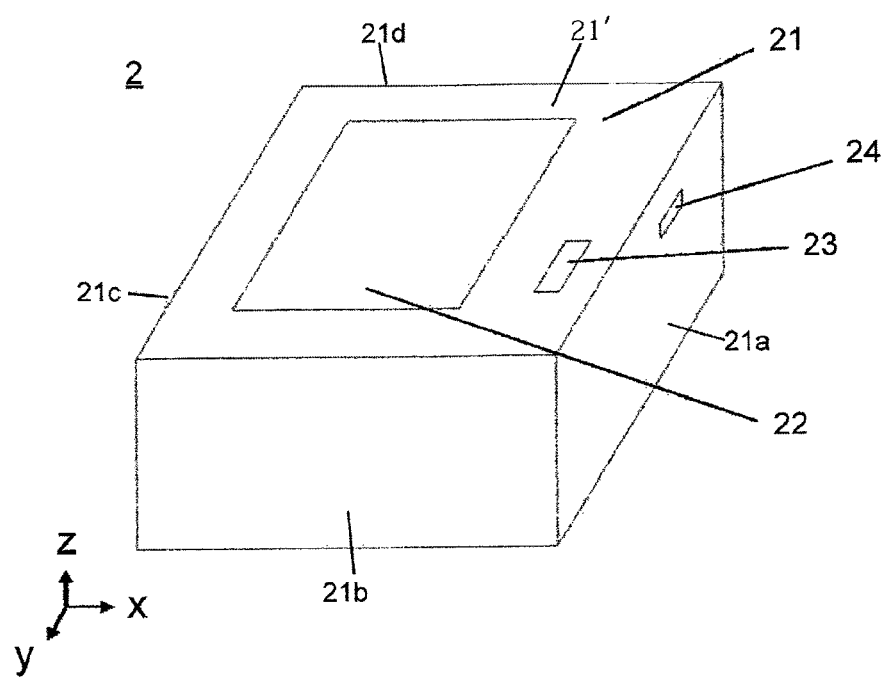
FIG. 2 is a schematic view of an example of an operation panel unit.

FIG. 1 is a schematic view of an example of an image forming apparatus in the present disclosure. FIG. 2 is a schematic view of an example of an operation panel unit in the present disclosure.

As depicted in FIGS. 1 and 2, the image forming apparatus 1 includes the operation panel unit 2. The operation panel unit 2 is configured to input various control instruction to the image forming apparatus 1. The operation panel unit 2 includes a display portion 21, a display surface 22, an NFC reading portion 23, and a USB port 24. The display surface 22 is located at a substantially central position of the top surface 21' of the display portion 21. The NFC reading portion 23 is also located on a top surface 21' of the display portion 21. The USB port 24 is located on the right side surface 21a of the display portion 21.

Preferably, in the present disclosure, the direction with respect to the operation panel unit 2 is defined as follows: a left-right direction when a user views from a direction perpendicular to the display surface 22 (i.e. an x-axis direction in FIG. 1) is a first direction, a direction perpendicular to the first direction on the display surface 22 (i.e. a y-axis direction in FIG. 1) is a second direction as an up-down direction. In FIG. 2, the USB port 23 is located above the NFC reading portion 23 in the second direction (i.e. the y-axis direction in FIG. 1).

Preferably, in the present disclosure, a region of the display portion 21 in the vicinity of an edge of the top surface 21' on which the display surface 22 is located is referred to as an edge portion. As depicted in FIG. 2, the NFC reading portion 23 and the USB port 24 may both be located closer to the same edge portion of the display portion 21.

Figure 3:
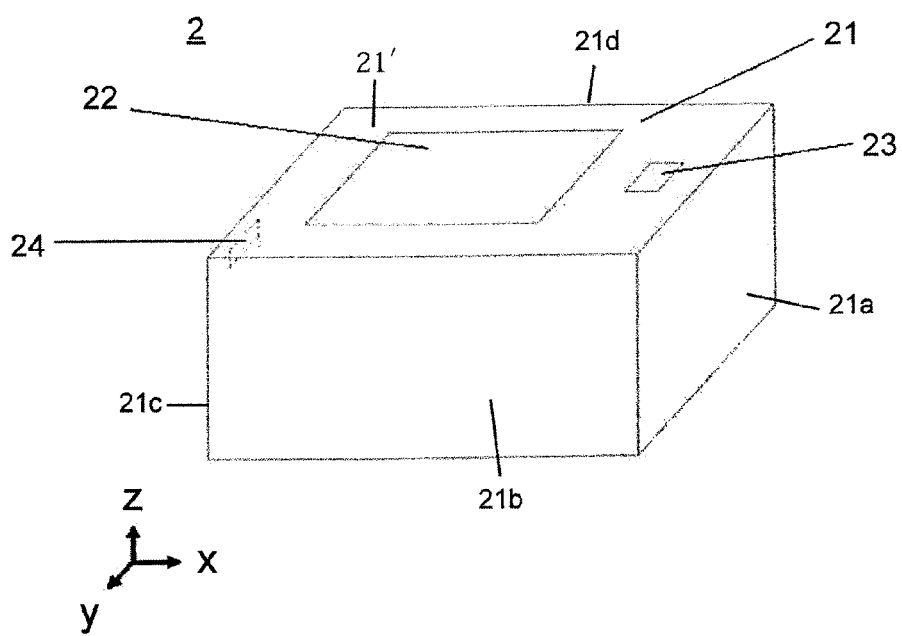
FIG. 3 is a schematic view of the other example of an operation panel unit.

Preferably, the NFC reading portion 23 and the USB port 24 may be located on different edge portions of the display portion 21. For example, as depicted in FIG. 3, the NFC reading portion 23 and the USB port 24 are respectively located on or in the vicinity of opposite side surfaces 21a, 21c of the display portion 21 in the first direction (i.e. the x-axis direction in FIGS. 1-4), thereby completely avoiding mutual interference when the NFC reading portion and the USB port are used at the same time. The present disclosure is not limited to the example of depicted in FIG. 3, and the NFC reading portion 23 and the USB port 24 may instead be respectively located at the other opposite side surfaces 21b, 21d of the display portion 21 in the second direction (i.e. the y-axis direction in FIGS. 1-4).

Figure 4:
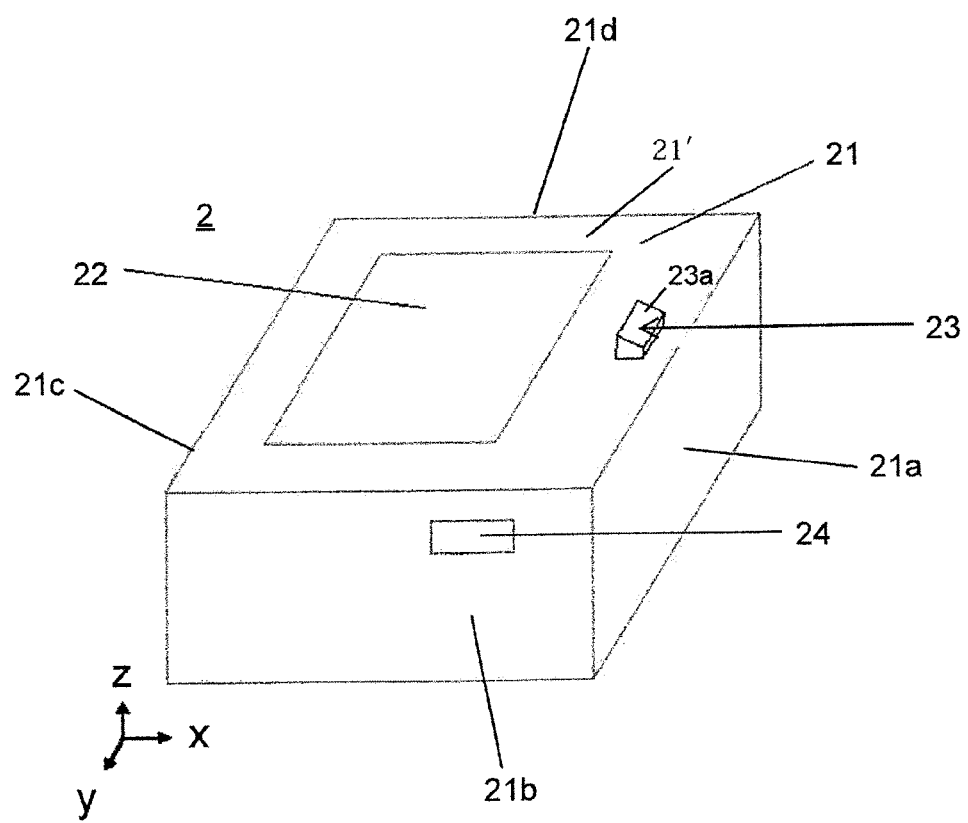
FIG. 4 is a schematic view of the other example of an operation panel unit.

Preferably, as depicted in FIG. 4, the present invention may also be configured such that a reading surface 23a of the NFC reading portion 23 is inclined with respect to the display surface 22 to facilitate the use of the NFC reading portion 23. In this case, in order to avoid possible interference, it is necessary to dispose the NFC reading portion 23 and the USB port 24 on different edge portions of the display portion 21. That is, if the NFC reading portion 23 is disposed on the edge portion of the top surface 21' of the display portion 21, on which the display surface 22 is also disposed, and nearer to the right side surface 21a of the display portion 21, then the USB port 24 is disposed on a different surface of the display portion 21, other than the top surface 21' and the right side surface 21a. For example, in FIG. 4, the USB port 24 is disposed on the front surface 21b of the display portion 21 adjacent to the right side surface 21a. The USB port 24 may also be disposed on the left side surface 21c of the display portion 21, opposite to the right side surface 21a, or on another side surface 21d opposite to the front surface 21b.

For example, in the above embodiment, the USB port 24 is located above the NFC reading portion 23 in the second direction (i.e. the y-axis direction in FIG. 1), however the USB port 24 may also be located below the NFC reading portion 23 in the second direction (i.e. the y-axis direction in FIG. 1).

Furthermore, the various embodiments in the present disclosure are not independent of each other. As long as there are not particular combining obstacles, it is obvious that various combinations and modifications may be made according to the various embodiments.

What is claimed is:

1. An operation panel unit for an image forming apparatus the operation panel unit comprising:
    a display portion having at least a top surface, a front surface, a right side surface and an opposed left side surface;
    an NFC reading portion disposed on the top surface of the display portion between a display surface of the display portion and the right side surface; and
    a USB port disposed on the front surface of the display portion;
    wherein an NFC reading surface of the NFC reading portion is inclined with respect to the display surface of the display portion, and
    wherein the NFC reading portion and the USB port are each disposed on different surfaces of the display portion from one another, but both are located closer to the right side surface of the display portion than to the left side surface thereof.

2. The operation panel unit according to claim 1, wherein the NFC reading surface of the NFC reading portion is inclined downwardly toward the right side surface.

3. An image forming apparatus comprising:
    an operation panel unit,
        wherein the operation panel unit comprises
            a display portion having at least a top surface, a front surface, a right side surface and an opposed left side surface,
            an NFC reading portion disposed on the top surface of the display portion between a display surface of the display portion and the right side surface of the display portion, and
            a USB port disposed on the front surface of the display portion,
        wherein an NFC reading surface of the NFC reading portion is inclined with respect to the display surface of the display portion, and
        wherein the NFC reading portion and the USB port are each disposed on different surfaces of the display portion from one another, but both are located closer to the right side surface of the display portion than to the left side surface thereof.

* * * * *